Sept. 17, 1935.　　　　B. H. MINTON　　　　2,014,690
MIRROR LIGHT
Filed Nov. 26, 1934
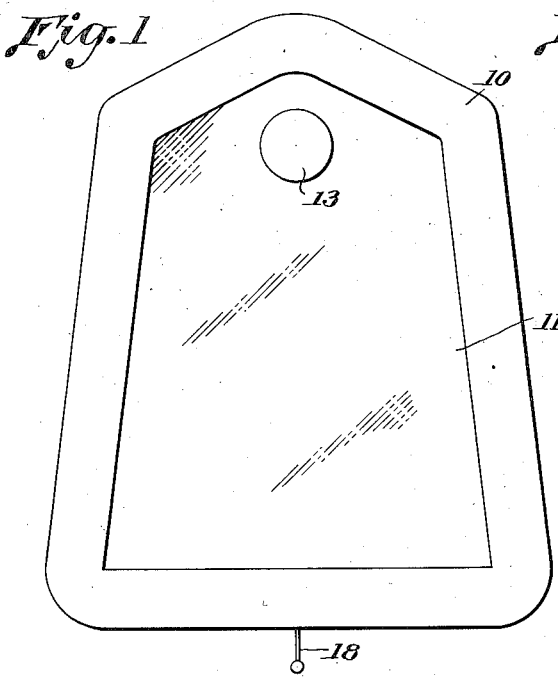
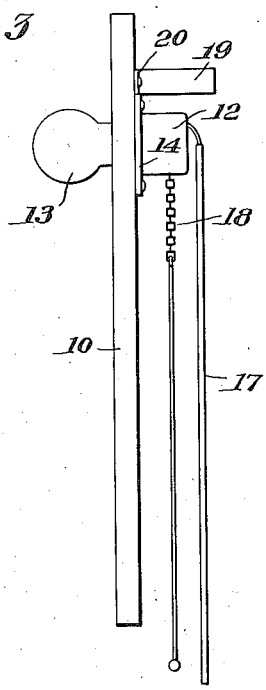
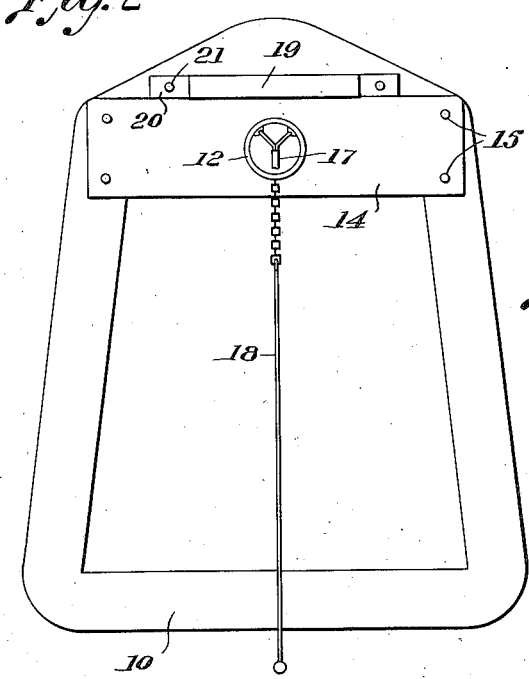
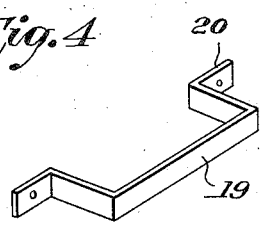
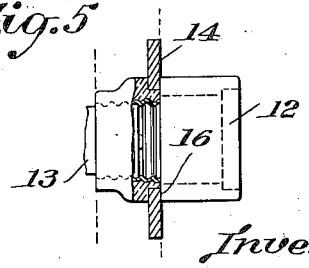
Inventor
Benjamin H. Minton Patented Sept. 17, 1935

2,014,690

UNITED STATES PATENT OFFICE 2,014,690

MIRROR LIGHT

Benjamin H. Minton, Huntington, Ind., assignor of one-half to Fred E. Beaty, Huntington, Ind.

Application November 26, 1934, Serial No. 754,893

2 Claims. (Cl. 240—4.2)

This invention consists of a mirror provided, as a unitary part thereof, with a light so arranged as not to interfere with the vision of the person using the mirror, and at the same time cast no such shadow on the person using the mirror as would interfere with the person obtaining the desired view.

The invention comprehends the provision of a mirror, whether of the wall or suspended type, or as a part of an article of furniture, such as a dresser, having a light forming a unitary part thereof, and which also can be easily arranged in the lighting circuit for the house by merely inserting a plug in a wall outlet or receptacle as is done in the case of floor and other such types of lamps.

A still further object of the invention is to provide a mirror so equipped with a light that the latter will serve the same purpose as any floor or stand lamp, and which at the same time will save floor space while being very decorative.

Futher, in accordance with the present invention, the lamp may be made a part of the mirror without resorting to expensive machinery and without requiring more than ordinary skill.

The invention, together with its objects and advantages, will be best understood from a study of the following description taken in connection with the drawing wherein:

Figure 1 is a front elevational view showing the features of the present invention.

Figure 2 is a rear elevational view of a mirror embodying the features of the present invention.

Figure 3 is a side edge elevational view of the mirror with the invention applied thereto.

Figure 4 is a perspective view of a spacer bracket hereinafter more fully referred to.

Figure 5 is a detail view with certain parts broken away and shown in section and illustrating the manner in which the device is associated with the mirror.

Referring to the drawing by reference numerals, it will be seen that 10 indicates generally a mirror of any suitable construction and design and which may be in the nature of a wall mirror or a mirror of the type forming part of an article of furniture, such as a boudoir dresser or the like.

In accordance with the present invention, the glass 11 of the mirror adjacent the upper end of the mirror is apertured in a manner to accommodate an end portion of a receptacle 12, the threaded end of which is disposed toward the front face of the mirror for the reception, in the usual manner, of an electric lamp or bulb 13.

Suitably supporting the receptacle 12 is a flat board or strip 14 that extends transversely of the mirror at the rear thereof and which is secured at its ends to the frame of the mirror as at 15. The strip or veneer 14 is provided with an opening registering with the opening in the mirror glass 11 and the receptacle 12 is provided with a groove 16 to accommodate the strip 14 as shown in Figure 5. An electric cord 17 has the wires thereof suitably and electrically connected with the contact elements of the receptacle 12 and at the free end thereof the cord 17 is provided with a plug (not shown) adapted to be engaged with a suitable wall receptacle or outlet for placing the bulb 13 in the house circuit.

The receptacle 12 is of a type equipped with a conventional pull chain switch, the pull chain for the switch being indicated by the reference numeral 18.

To insure the spacing of the mirror from a wall or the like from which the mirror may be suspended, or against which the article of furniture so equipped with the mirror may be placed, there is provided at the rear side of the mirror a substantially U-shaped bracket 19 formed from a single strap of metal and provided with apertured attaching flanges 20 whereby the bracket is secured to the frame of the mirror by screws or other suitable fastening devices 21.

From the above, it will be apparent that when one wishes to light the bulb 13 all that is necessary is to reach behind the mirror and to pull the chain 18 for closing the switch that is associated with the receptacle 12. With the bulb 13 thus illuminated, sufficient light will be provided to enable the user to get a clear view of himself in the mirror, the mirror also acting as a reflector for the bulb 13 so that a better illumination will be obtained than is obtainable from the usual wall light or dresser lamp as is now generally used.

What is claimed is:

1. In a mirror, a frame, a mirror glass mounted in said frame and provided adjacent its upper edge with an opening, an apertured supporting strip secured to opposite sides of the frame and extending transversely of the mirror rearwardly thereof with the aperture in said strip aligning with the aperture in the mirror, a lamp socket extending through the aperture in said strip and provided with a circumferential groove into which the edge of the strip about said aperture fits for retaining the socket against axial displacement, a lamp bulb projecting forwardly of the mirror and having its base extending through the opening in the mirror and threadedly engaged with said socket, said socket also including a snap switch and a pull chain for the switch.

2. In a mirror having a frame and a mirror glass mounted in said frame; said glass being provided with an opening, an apertured supporting strip secured to the frame and extending transversely of the glass rearwardly of the mirror with the aperture in said strip aligning with the opening in the mirror, a lamp socket extending axially through the aperture in the strip and provided with a circumferential groove receiving the edge of the strip defining said aperture, a lamp bulb engageable with the socket through the opening in the mirror, and a spacer member mounted on the frame above said strip and projecting rearwardly beyond the strip for spacing the upper portion of the mirror away from a wall or analogous support.

BENJAMIN H. MINTON.